United States Patent [19]

Pierce

[11] Patent Number: 5,402,131
[45] Date of Patent: Mar. 28, 1995

[54] DETECTION OF RADAR TARGETS USING HIGHER-ORDER STATISTICS

[75] Inventor: Robert D. Pierce, Sterling, Va.

[73] Assignee: The United States of America as represented by the Secretary of the Navy, Washington, D.C.

[21] Appl. No.: 127,619

[22] Filed: Sep. 28, 1993

[51] Int. Cl.⁶ ..................... G01S 13/526; G01S 7/292
[52] U.S. Cl. ................................... 342/194; 342/196; 342/159; 342/162
[58] Field of Search ............... 342/194, 192, 196, 162, 342/159

[56] References Cited

U.S. PATENT DOCUMENTS

| | | | |
|---|---|---|---|
| 5,157,403 | 10/1992 | Urkowitz | 342/111 |
| 5,227,801 | 7/1993 | Pierce | 342/192 |
| 5,231,403 | 7/1993 | Pierce | 342/192 |

*Primary Examiner*—John B. Sotomayor
*Attorney, Agent, or Firm*—Charles D. Miller

[57] ABSTRACT

A signal detection system, preferably for use with a coherent radar system selects certain combination of input signal samples in a block of signal samples to derive a test statistic which is unbiased by Gaussian noise. Products of pairs of sample values are stored in a data sample look-up table. An index look-up table is created by scanning through possible combinations of addresses and excluding those combinations of sample values which would be redundant over other combination and would result in a contribution to biasing by noise. Pairs of addresses from the index look-up table are then used in sequence to access first and second products from the data sample look-up table. The first product is multiplied by the complex conjugate of the second product and the (quadruple product) result is averaged to form a test statistic which is insensitive to position and constant velocity. Detection of the signal is determined by testing the real part of the averaged test statistic against a threshold. To allow such detection for an accelerating target, a lag index is derived for each combination of addresses in the index look-up table and the accumulation and averaging is done while sorting in accordance with the lag index. Dynamic adjustment of the test statistic compensates for time-varying clutter such as ocean waves, and allow the signal detector to track a substantially constant false alarm rate.

20 Claims, 8 Drawing Sheets to FIG.5A

DETECTION OF RADAR TARGETS USING HIGHER-ORDER STATISTICS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention generally relates to radar imaging systems and, more particularly, to radar target detection in environments presenting large amounts of clutter and noise to the radar receiver.

2. Description of the Prior Art

Radar is a radio device or system that detects the presence and location of an object by means of radio waves which are reflected from the object and then analyzed to determine characteristics of the object. Since the invention of radar for location of distant objects, numerous techniques of signal processing have been used to enhance the image obtained from the returned signal and to reduce noise. Recent coherent radar systems have improved the imaging of the object to obtain additional, high-resolution signatures of the object for purposes of identification. However, system noise and clutter remain a major obstacle to radar imaging.

In seagoing applications, in particular, waves of the water surface are a major source of clutter which may obscure the object to be detected. Detection of an object is achieved when the returned signal has been processed to the point that an object present, amid clutter and noise, can be differentiated from the false detections caused by environmental artifacts, particularly time-varying clutter such as ocean waves.

Modern coherent radar systems detect objects by storing a transmitted signal or waveform which is then combined with the returned signal in a synchronous or phase sensitive detector to produce in-phase (I) and quadrature (Q) samples at baseband. These samples are then processed and compared to a threshold to determine detection. With ideal coherent detection, the phase of the signal from the target must be known, a priori. However, the obtaining of information concerning the location and velocity of a target, both of which affect phase, is the basic objective of a radar system. Ideal coherent detection therefore serves as a basis for comparison for other types of radar systems rather than being a practical or even realizable radar system.

In the general case where the target is in motion relative to the detector, the phase of the target signal is not known and coherent detection cannot easily be used. For example, a phase history for each of a large plurality of possible signal trajectories could be synthesized in a similarly large plurality of coherent detectors and the results compared to determine detection. Accordingly, non-coherent so-called envelope detectors in which the returned signals are analyzed using a square-law device (e.g. $I^2+Q^2$) are more commonly used.

Envelope detectors do not require a knowledge of phase but this absence of information results in a loss of sensitivity compared with coherent detectors. This loss of sensitivity implies that a higher signal-to-noise ratio (SNR) is required for similar levels of performance, generally specified as a receiver operating characteristic (ROC). Receiver operating characteristics are plots of the probability of detection against the probability of false alarm for different signal-to-noise ratios.

More recently, higher-order statistics (HOS) have been used by the inventor to analyze the output of a coherent radar synchronous detector in the frequency domain as disclosed in U.S. Pat. Nos. 5,227,801 and 5,231,403, to Robert D. Pierce which are hereby fully incorporated by reference, in order to obtain down-range profiles and to obtain an estimation of velocity of moving targets, respectively. HOS methods have the advantages of preserving phase information, insensitivity to linear phase shifts and suppression of Gaussian noise. However, these techniques have assumed detection of the target prior to performing these functions and operate in the domain of the radar's carrier frequency wherein the output is stepped in frequency to obtain down-range resolution.

Another application of higher-order statistics to noise reduction during signal detection in an imaging system is disclosed in "Signal Detection and Classification Using Matched Filtering and Higher Order Statistics" by Georgios B. Giannakis and Michael K. Tsatsanis, published in IEEE Transactions on Acoustics, Speech and Signal Processing, Vol. 38, No. 7, July 1990. The method of signal detection disclosed therein is based on using the higher-order statistics related to signal energy as a detection test statistic. An estimate of the zeroth lag of the kth-order correlation is computed. The third-order correlation is zero for the complex I and Q (e.g. $I+iQ$) samples but the fourth-order correlation can be used as a detector. For each set of samples in this technique, the test statistic is developed from fourth-order and second order averages of the I and Q samples taken at each time step. The second-order average accumulates the I and Q magnitude squared which is the same as the quadratic detector test statistic. The fourth-order average accumulates the I and Q magnitude raised to the fourth power and contains second order terms related to the additive Gaussian noise for which estimates are made and removed. This involves doubling the averages of the accumulated second-order products and subtracting them from the average of the accumulated fourth order products.

Since the technique disclosed by Giannakis et al. involves correcting an estimate with another estimate, uncertainty of detection is increased. Also, the removal of second-order estimates requires a significant fraction of the processing time of the technique. Further, the technique of Giannakis et al. is, in the article, applied to image extraction in which noise may be more likely to be accurately described by Gaussian distributions. The spiky and modulated nature of time-varying sea clutter is expected to have deleterious effects on the performance of the fourth-order detector of Giannakis et al.

SUMMARY OF THE INVENTION

It is therefore an object of the present invention to provide a radar target detection system and method of increased sensitivity and improved performance.

It is another object of the invention to provide a radar detection system and method capable of target detection at reduced signal-to-noise ratios.

It is a further object of the invention to provide a computationally practical technique of exploiting the properties of coherent radar signal reception in detection of moving targets.

In order to accomplish these and other objects of the invention, a signal detection method is provided including a computation of a test statistic from combinations of values in a block of signal samples, including the steps of eliminating combinations of samples which are redundant, excluding combinations of samples in which noise would bias the test statistic from the list of said combinations of samples, and determining detection of a signal based on a test statistic computed only from remaining combinations of samples.

In accordance with another aspect of the invention, an apparatus for detection of a signal in the presence of noise is provided comprising a data sample look-up table for storing products of pairs of data values from a block containing a plurality of data values, an index look-up table containing combinations of addresses, in first and second pairs, for accessing values in the data sample look-up table in which combinations of addresses which are redundant over other combinations of addresses in said index look-up table and combinations of addresses in which either of the addresses of said first pair of addresses was the same as one of the addresses of said second pair of addresses are excluded.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
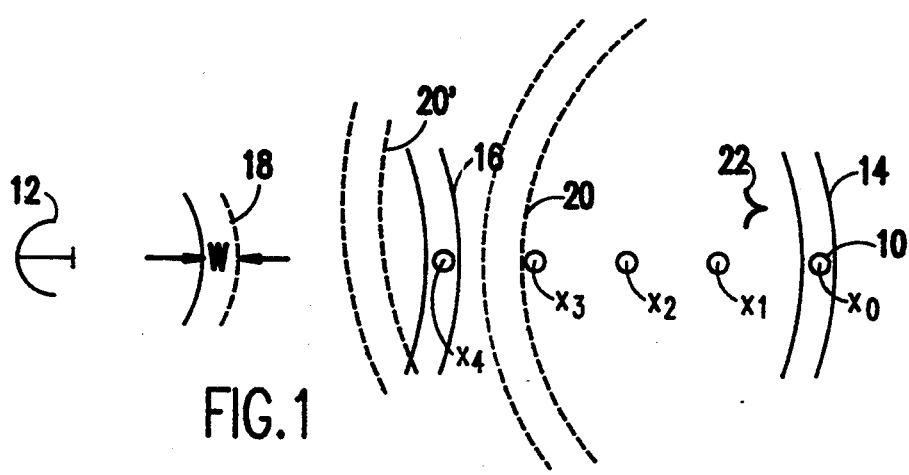
FIG. 1 is a plan view of an arbitrary positional relationship between a radar transmitter/receiver and a moving target to be detected.
Figure 1A:
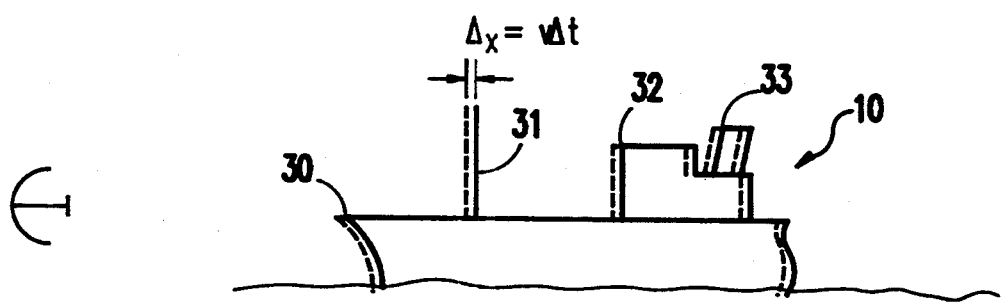
FIG. 1A shows a detail view of an arbitrary target as an array of radar reflectors.

Referring now to the drawings, and more particularly to FIG. 1, arbitrary locations of a moving target and a radar transmitter/receiver are shown in plan view. The moving target 10 is shown at an initial location $x_0$ and will assume the locations indicated at $x_1$, $x_2$, $x_3$ and $x_4$ at respective subsequent times $t_a$, $t_b$, $t_c$ and $t_d$. Radar transmitter/receiver 12 emits a series of fixed frequency pulses (e.g. 14, 16 or 18, which may be included among other pulses or portions of bursts) and which may be reflected back toward the transmitter/receiver 12 from target 10, as indicated at 20, or from waves or ground clutter 22, as indicated at 20'. For example, the pulses in each series of pulses are equally separated in time and transmitted over a relatively short interval (e.g. approximately 0.8 seconds for 32 pulses). It is assumed in the following discussion that the fixed frequency pulses have a duration w sufficient to envelop the target or at least a plurality, N, of radar signal reflecting surfaces thereof, such as hull 30, crane 31, superstructure 32 and stack 33 of a ship, as shown in FIG. 1A and that these same radar signal reflecting surfaces will remain within a region of width w during the interval of transmission of the number of pulses, as depicted by dashed lines in FIG. 1A. Of course, it will be understood by those skilled in the art from this discussion that the resolution associated with width w could also be achieved using synthetic aperture techniques such as synthetic aperture radar (SAR) and inverse synthetic aperture radar (ISAR).

Figure 2:
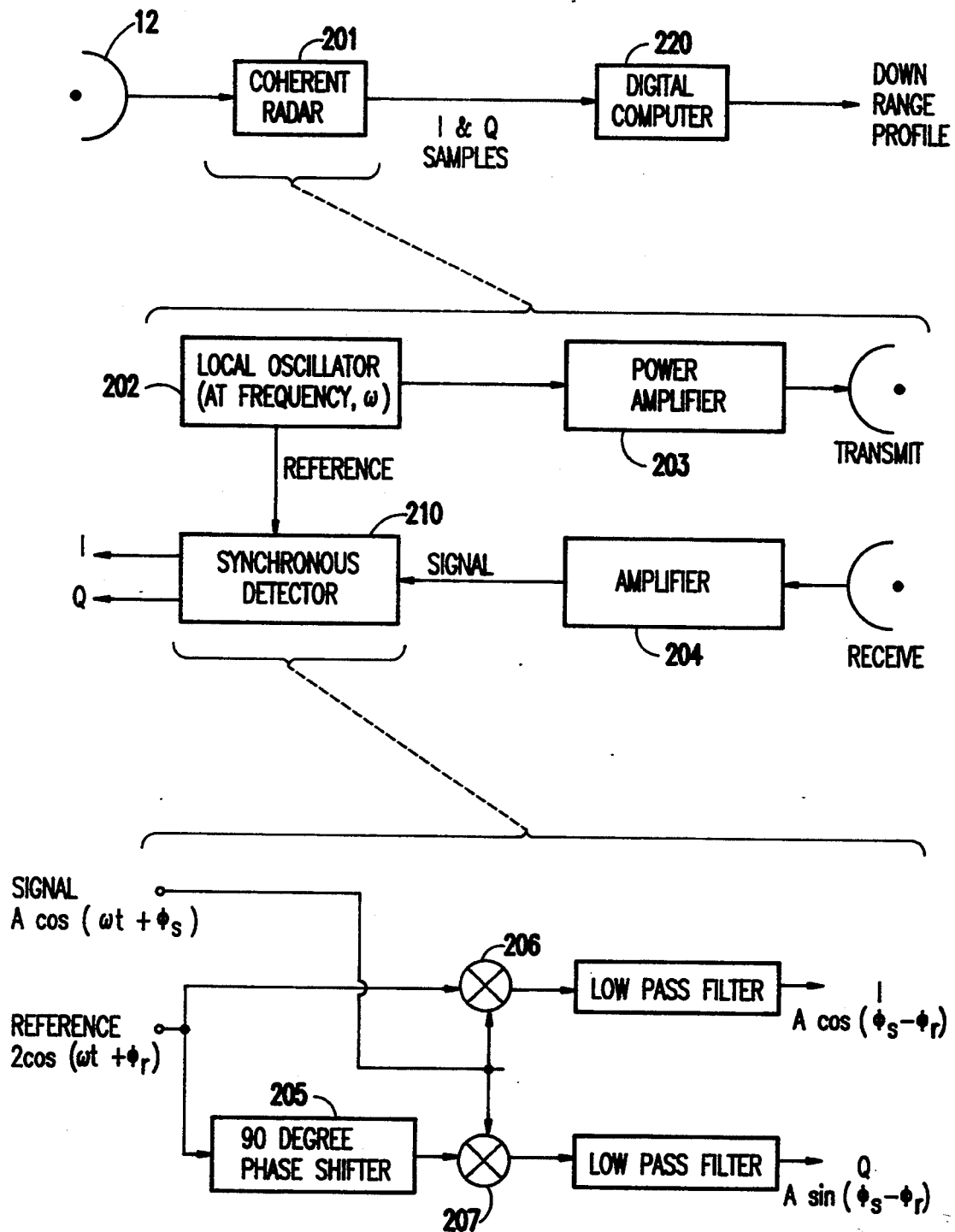
FIG. 2 is a schematic diagram of a coherent radar system and a digital computer for signal analysis in accordance with the invention.

Radar transmitter/receiver 12 is illustrated in schematic form in FIG. 2. The overall arrangement 200 includes a coherent radar system 201 and a digital computer 220 for processing the signals. The coherent radar includes a local oscillator 202 driving a power amplifier 203 in order to transmit energy to a target from an antenna or other transducer. The returned signal is received by the same or another transducer, amplified at 204 and synchronous detection performed by synchronous detector 210. The synchronous detector 210 includes a phase shifter 205 which applies a shifted reference signal to multiplier 207. The reference signal is directly applied to multiplier 206. Multipliers 206 and 207 also receive the returned signal from amplifier 204. Low pass filtering is applied to both channels to remove harmonics in the outputs of the multipliers and the filtered signals are output to digital computer 220.

Digital computer 220 in accordance with the invention, provides, preferably by means of a suitable program, means for forming a test statistic for the detector as a particular triple correlation estimate formed from averages of fourth order products of the I and Q samples of the synchronous detector output. This correlation, as will be demonstrated below, is constructed to be insensitive to initial target location, target velocity and unbiased by Gaussian noise. The mean or expected value of the test statistic is the signal power squared multiplied by a complex valued term where the phase shift of the term is proportional to target acceleration and the product of certain correlation lags. The square of the signal power is also proportional to the square of the radar cross-section (RCS).

More specifically, the invention provides for deliberately avoiding terms related to Gaussian noise and constructs the test statistic from combinations of samples which are unbiased thereby. In contrast with the technique disclosed by Giannakis et al., this avoids the need to compute and remove the second-order estimates and also avoids the increased uncertainty of detection believed to be inherent in removing the secondorder estimates. Thus the approach of Giannakis et al. is opposite to the methodology of the present invention since Giannakis et al. removes an estimate of the bias due to noise while the present invention excludes combinations of samples which would bias test statistic.

Also, in accordance with the invention, the computation of the fourth-order correlation is made more efficient by reducing the number of combinations of samples. Indexing the combinations of samples by lag, in accordance with the invention, further provides for reliable detection of accelerating targets which defeat some other detection techniques which are capable of relatively high sensitivity and resolution. Indexing by lags also provides for output in the form of an acceleration spectrum which can indicate the presence of plural targets moving at different accelerations.

After conversion to baseband using a synchronous detector 210, the I and Q samples are represented by the complex radar signal r, reflected from a target for the jth pulse at time $t_j$, is $$r(t_j) = s(t_j) + \eta(t_j) \tag{1}$$

where s is the target signal and $\eta$ is noise and clutter. The wave number, k, of the transmitted pulse is related to the radar signal frequency, f, by $$k = \frac{2\pi}{c} f \tag{2}$$

where c is the speed of light. The noise and clutter samples, $\eta$, are assumed to be statistically independent from one pulse to the next, of zero mean value and Gaussian distributed.

The target is assumed to consist of a non-rotating collection of N point scatterers with strength $a_n$, located at relative positions, $x_n$, such that the target's signal is given by $$s(t_j) = \sum_{n=1}^{N} a_n e^{-i2(x_0 + x(t_j) + x_n)k} \tag{3}$$

which expresses both the amplitude and phase components of s ($t_j$) which will be preserved throughout the following processing.

Starting at the initial position, $x_0$, at $t_j=0$, the collection of scatterers move at a fixed velocity, v, or fixed acceleration, $\xi$, along the radar's line-of-sight by advancing by the amount $$x(t_j) = vt_j + \frac{\xi}{2} t_j^2 \tag{4}$$

toward or away from the transmitter for the jth pulse or time step where $t_j = \Delta t\, j$. A total number of J samples of the radar data are used. (It should be noted that a substantial component of velocity orthogonal to the radar's line of sight shown in FIG. 1 is tolerable so long as the target does not appear, from the transmitter location, to significantly rotate during the transmission period of J pulses.) The I and Q samples from the target reflection plus system noise and clutter reflections are formed into averages of special quadruple products.

In the derivation of the HOS test statistic, the following fourth order product or estimator is examined:

$$B(t_a,t_b,t_c,t_d) = r(t_a)r(t_b)r^*(t_c)r^*(t_d)\text{tm} \tag{5}$$

where $t_a$, $t_b$, $t_c$ and $t_d$ are defined from 0 to $T_j$ and $$T_j = \Delta t\, J \tag{6}$$

With the coherent pulsed radar, r ($t_j$) is sampled from $1 \leq j \leq J$, from which samples at times $t_a$, $t_b$, $t_c$ and $t_d$, in the following discussion, are drawn, where a, b, c and d, at this point of the process are arbitrary ones of, for example, J=32 samples but are limited in order and combination by further processing in accordance with the invention as will be described below.

The general characteristics of the fourth order product given in equation (5) are developed by first substituting equations (1) and (3) into equation (5) to obtain the expected value (mean value) to which an HOS estimator, discussed below, will average:

$$\bar{B}(t_a, t_b, t_c, t_d) = E[B(t_a, t_b, t_c, t_d)] = \tag{7}$$

$$\sum_{n=1}^{N} \sum_{m=1}^{N} \sum_{p=1}^{N} \sum_{q=1}^{N} a_n a_m a^*_p a^*_q e^{-i2[\cdot]k}$$

where $$[\cdot] = (x_0 + x(t_a) + x_n) + (x_0 + x(t_b) + x_m) - \tag{8}$$

$$(x_0 + x(t_c) + x_p) - (x_0 + x(t_d) + x_q)$$

Therefore, by collecting terms in equation (8)

$$[\cdot] = (x_n + x_m - x_p - x_q) + (x(t_a) + x(t_b) - x(t_c) - x(t_d)) \tag{9}$$

where n, m, p and q are relative positions of point scatterers on the target. However, the terms $x(t_a), \ldots x(t_d)$, which are independent of position on the target, may be factored out of equation (7). Therefore, having multiple point scatterers does not degrade the methodology or performance of implementing apparatus in accordance with the invention. Equation (7) thus essentially shows that sums of the complex signals reflected from the target for a plurality of pulses is position insensitive since $x_0$ is canceled in accordance with the [.] phase term but which retains phase information due to velocity and acceleration.

Now, using equation (4)

$$(x(t_a) + x(t_b) - x(t_c) - x(t_d)) = \tag{10}$$

$$v(t_a + t_b - t_c - t_d) + \frac{\xi}{2}(t_a^2 + t_b^2 - t_c^2 - t_d^2)$$

and the following observations may be made:

The fourth order estimator is insensitive to constant velocity when $$t_a + t_b - t_c - t_d 0 \tag{11}$$

since the condition specified in equation (11) provides a coefficient of zero for the velocity term. The estimator is insensitive to the initial position of the target since $x_0$ is canceled and does not appear in equation (9). The estimator is also unbiased by Gaussian noise when $t_a$ and $t_b$ being equal to $t_c$ are excluded, that is (and for reference)

$$t_a \neq t_c, \quad t_b \neq t_c \tag{12}$$

Figure 3:
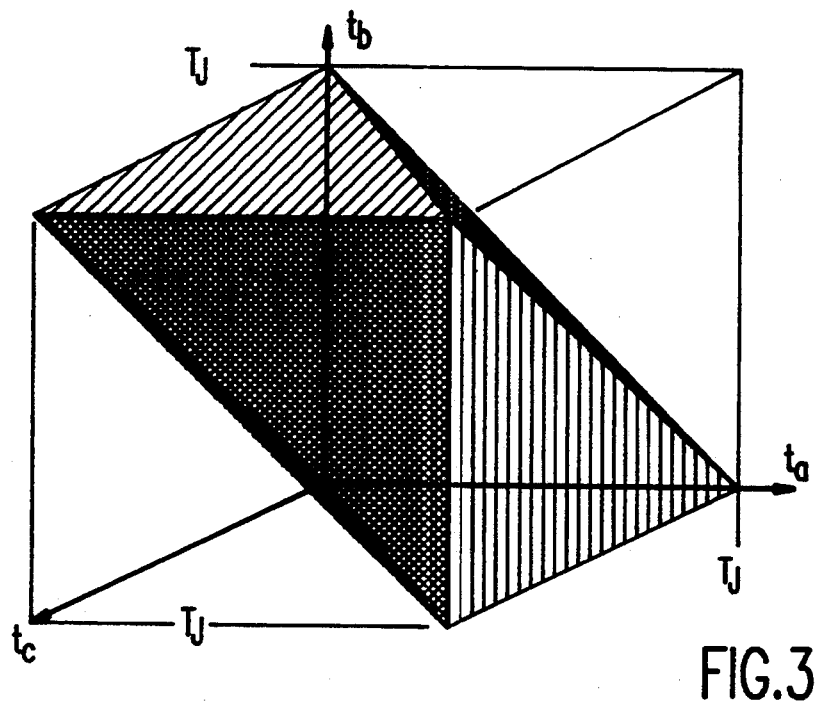
FIGS. 3 and 4 illustrate the domain of support and principal region thereof for the analysis of signals in accordance with the invention.
Figure 4:
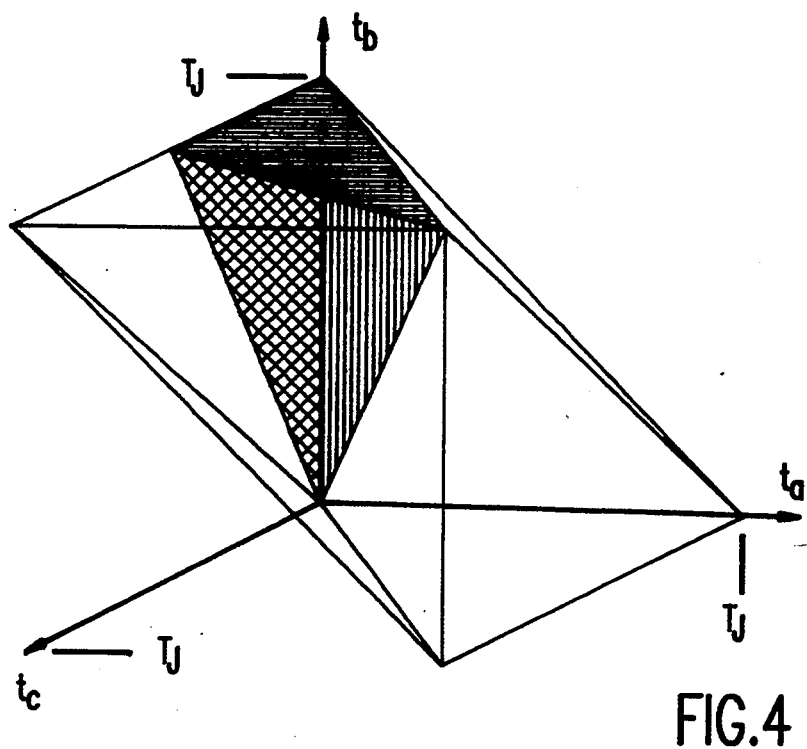

The domain of support for these conditions (equations (11) and (12)) is shown in FIG. 3. Therefore, the principal region of the domain of support, shown in FIG. 4, is the volume remaining after all redundancies due to symmetry have been removed. The term $t_d$ can be eliminated by substitution in Equation (11) and is not shown in FIGS. 3 and 4. That is, each point in the domain of support or the principal region thereof corresponds to a point $t_d$ which may be uniquely defined by values of $t_a$, $t_b$ and $t_c$. The volume of the principal region is one-eighth that of the domain of support and satisfies the following conditions $$0 \leq t_a \leq T_j, \quad t_a \leq t_b \leq T_j,$$

$$0 \leq t_c \leq T_J, \ t_c \leq t_d \leq T_J, \text{ and} \qquad (13)$$

$$t_a^2 + t_b^2 \geq t_c^2 + t_d^2$$

It is important to note that under these conditions (equation (13)), the estimator is unaffected by motion of the target which causes phase change, so long as it is substantially constant in velocity.

Additionally, from equation (10), certain combinations of $t_a$, $t_b$, $t_c$ and $t_d$ will result in a constant phase for a constant acceleration. To find this condition, let $$t_a = \Delta t \ j_a, \ t_b = \Delta t \ j_b, \text{ and } t_c = \Delta t \ j_c \qquad (14)$$

and eliminate $t_d$ using equation (11) to form $$t_a^2 + t_b^2 - t_c^2 - t_d^2 = 2\Delta t^2 (j_a j_c + j_b j_c - j_c^2 - j_a j_b) \qquad (15)$$

Then, define the single dimension lag, l, by $$l = j_a j_c + j_b j_c - j_c^2 - j_a j_b \qquad (16)$$

so equation (7) becomes $$B(l) = e^{-i2k\xi\Delta t 2l} \left| \sum_{n=1}^{N} a_n e^{-i2xnk} \right|^4 \qquad (17)$$

It should be noted that the N point scatterers are effectively combined into the signal power squared by the conditions imposed on choice of $t_a$, $t_b$, $t_c$ and $t_d$.

The magnitude of equation (17) is signal power squared where signal power, also referred to as radar cross-section (RCS), is defined as $$ss^* = \left| \sum_{n=1}^{N} a_n e^{-i2xnk} \right|^2 \qquad (18)$$

Since multiple combinations of $j_a$, $j_b$ and $j_c$ result in the same lag, l, and since the expected value is identical for each such combination, the HOS estimator can be formed by averaging those combinations with the same l. The HOS estimator, from which the HOS test statistic is derived (as the real part of the HOS estimator), is then $$T(l) = \frac{1}{J_c} \sum_{j_a}^{J} \sum_{j_b}^{J} \sum_{j_c}^{J} r(\Delta t \ j_a) r(\Delta t \ j_b) \qquad (19)$$

$$r^*(\Delta t \ j_c) r^*(\Delta t \ j_d)$$

for either the constant velocity case or the constant acceleration case. However, for the constant acceleration case, the HOS estimator has averages that are separately processed for each value of l, since, for each such value of l, phase will be constant.

That is, equation (19) represents summing and averaging equation (5) over combinations of $t_a$, $t_b$, $t_c$ and $t_d$ limited to the conditions specified by equations (11), (12) and (13). Additionally, for the constant acceleration case, the combinations of $t_a$, $t_b$, $t_c$ and $t_d$ are further limited, as will be discussed below, and sorted by l for Fourier transform processing.

For the constant velocity case, $J_c$ in equation (19) is given by $$J_c = -\frac{J}{12} - \frac{J^2}{8} + \frac{J^3}{12} \qquad (20)$$

and $j_a$, $j_b$ and $j_c$ are samples taken from the principal region modified to exclude the region where Gaussian noise biases the HOS estimator of equation (19). Lag, l, is selected according to equation (17) and the expected value of the HOS estimator is the same as equation (16). For the constant acceleration case, $J_c$ varies depending on the number of averages for each lag, as will be discussed below. It is thus seen that, depending on the application, two cases are treated in accordance with the invention: constant velocity and constant acceleration Of the target. In both cases, detection occurs when the HOS test statistic exceeds a threshold.

For the constant velocity case, all allowable lags (e.g. meeting the conditions of equations (11), (12) and (13)) of the HOS estimator of equation (19) have the same expected value and may be averaged. The detection test statistic is the real part of the HOS estimator average. For example, if $J = 32$, then $J_c = 2600$ (by equation (20)) fourth order products are averaged together to form a single HOS test statistic. Thus Gaussian noise and clutter are greatly attenuated.

For the constant acceleration case, each lag (having the same phase) is separately averaged by equation (19), the fast Fourier transform (FFT) of the average is taken to separate the target acceleration (e.g. phase change) into "bins", and the test statistic is the real part of the term taken from the bin with the largest real part. This is preferably accomplished, for example (with $J = 32$) by evaluating equation (19) over the principal region where the estimate of T(l) is unbiased by Gaussian noise. In this region, l will vary over the range from 1 to 240. Some combinations of l will not be available and the number of values of l which are averaged will not be uniform. (For example, over the range of values of l from 1 to 64, l=31, 37, 41, 43, 47, 53, 59, 61 and 62 do not produce a test statistic since no three integers satisfying equations (11), (12) and (13) have these numbers as a product. The number of values to be averaged ranges from 1 at l=58 to 68 at l=12, 24 and 36.) This reduces the sensitivity of the system somewhat (for constant J), as will be discussed below, but still results in improvement in sensitivity over prior radar systems.

Equation (17) is conjugate symmetrical about l=0. Data values from 1 to 64 thus may be used with conjugate symmetry (which assures that the FFT is real valued) to produce data values for a 128 point fast Fourier transform with interpolation used to fill in the missing-values, including l=0. A full cosine data window (e.g. Hanning window) is then preferably applied. The process thus uses 1733 of the possible 2600 fourth order products and reduction of Gaussian noise and clutter is correspondingly large.

THUS, if the target of interest is accelerating, then equation (19) is averaged at each l and its Fourier transform taken over l. The test statistic preferably is the transformed term with the largest real part. Interestingly, the displacement of this term from the origin (e.g. the displacement of the "bin" relative to the center of the array of "bins", which corresponds to zero acceleration or constant velocity) is proportional to the target's acceleration. This property can be graphically exploited to provide a "spectrum" of target acceleration.

Referring now to FIGS. 5, 5A, 5B and 6, the constitution and operation of a preferred embodiment of the invention will now be discussed. It should be noted that while a special purpose processor could be provided and may provide some performance enhancement, it is presently preferred to emulate the functional elements shown in FIGS. 5, 5A and 5B with a suitably programmed general purpose processor in view of the ease of doing so, as is well-understood in the art, and the flexibility for modification provided thereby. In this regard, it should be noted that certain types of noise, such as sea clutter are only approximated by Gaussian noise functions and there is much debate among those skilled in the art concerning processing enhancements, some of which will be discussed below, which will allow rejection of a portion of the small amount of noise remaining. Therefore, the flexibility for adding or removing some processing steps afforded by the utilization of a general purpose processor is preferred.

It should also be understood that there are substantial trade-offs between processing speed and hardware utilization, even in a general purpose computer and the implementation illustrated is deemed to be a preferable compromise between these factors. While substantial memory is utilized by (e.g. dedicated to) storage of certain data and intermediate results, the storage requirements are satisfied by most currently available personal or even notebook computers and the processing can be done for a block of thirty-two samples in a fraction of a second even with processors of modest computing power. In particular, this preferred combination of storage and processing allows certain portions of the processing to be performed in parallel with consequent limitation of the number of data fetches, as will be evident from the flow chart of FIG. 6.

Figure 5:
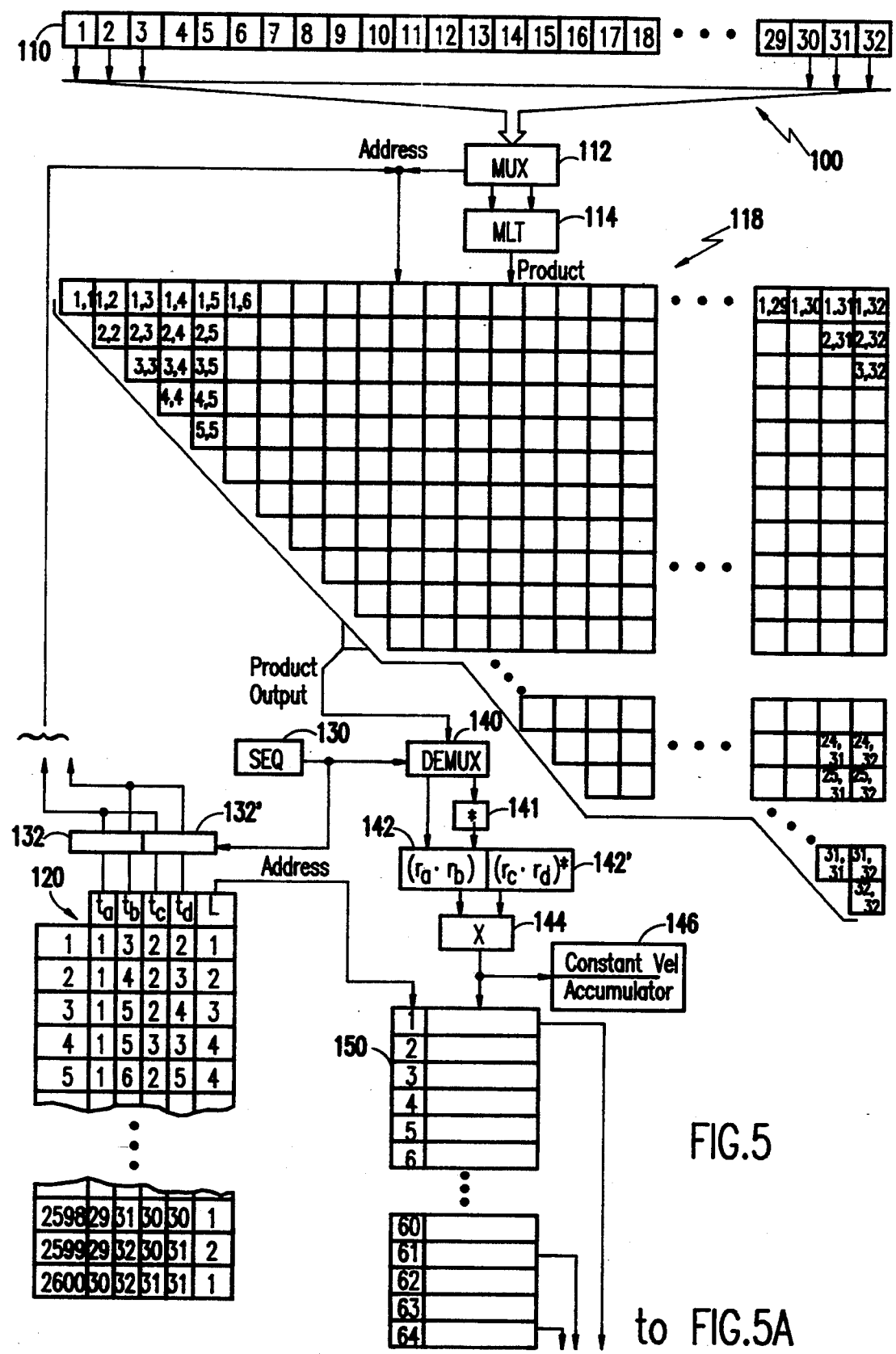
FIGS. 5, 5A and 5B are schematic diagrams explaining a preferred embodiment of the invention.

The major storage elements of implementation 100 as shown in FIG. 5 include a sample register 110, a data sample look-up table 118 and an index look-up table (LUT) 120. Data storage space is set aside in high-speed Random Access Memory (RAM) accessible by the processor during initialization step 202 of process 200 illustrated in FIG. 6. Then, index look-up table 120 is created.

It is considered important to the preferred implementation of the invention to create the index LUT 120 in such a way as to eliminate all data which is not a portion of the principal region discussed above with reference to FIG. 4. Specifically, for $J=32$ complex (I and Q) data samples in a block, this reduces the amount of data stored and the consequent number of computations of equation (19) from 32,768 to 2600, in accordance with equation (20). Additionally, it is both hardware efficient and computationally efficient to compute and store lag indices, l, during creation of the index LUT. Therefore, even though for a constant J, the addresses provided into the data sample LUT and lag indices for various combinations of samples would always be the same, the possibility of change of J and the size of the index LUT's which would result make it preferable to create the index LUT anew each time the processing in accordance with the invention is performed in view of the simplicity of doing so in combination with computation of l for each address.

Specifically, the index LUT is preferably created by four nested loops with exit conditions for a, b or c being equal to J and branching conditions which discard combinations of a, b and c (or, more properly, $t_a$, $t_b$ and $t_c$) which do not meet the conditions specified in equations (11), (12) and (13), above. The preferred procedure for creating the index LUT requires only a relatively few FORTRAN ™ commands and may be expressed as follows, wherein npts=J:

npas=0

Main loop-loop over all combinations (states) of ja, jb, jc and jd that will be tested.

do 20 ja=1,npts

Restrict jb to be equal to or greater than ja to remove redundancy in accordance with equation (13).

do 20 jb=ja, npts do 20 jc=1, npts

Restrict jd to be equal to or greater than jc to remove redundancy in accordance with equation (13).

do 20 jd=jc,npts

Then apply equation (11) to remove combinations of ja, jb, jc and jd which do not satisfy it. Of course, jd could be computed directly from ja, jb and jc. Then discard combinations of samples which would cause sensitivity of the average by target velocity.

jta = ja + jb − jc − jd
    if(jta · eq · 0) go to 30
    go to 40
    30 continue Then, combinations are excluded which would cause biasing of the average by Gaussian noise.

if(ja.eq.jc) go to 40 if(jb.eq.jc) go to 40

Then, equation (14) is calculated and the sum is restricted to greater than or equal to 0 in accordance with the last condition of equations (13) to remove redundant states.

jtb=ja2+jb2−jcs−jd2 if(jtb.lt.0) go to 40

Then l is computed (as jtb2) in accordance with equation (15) and a maximum is iteratively found.

jt2:jtb/2 if(jtb2.gt.imax) imax=jtb2

The index LUT 120 is completed by storage as an address to the index LUT (npas) varies from 1 to 2600.
    npas=npas+1
    jja(npas)=ja
    jjb(npas)=jb
    jjc(npas)=jc
    jjd(npas)=jd
    jab(npas)=jtb2

The process is exited when looping is completed to ensure that the index LUT will not exceed required limits and the number of possible states which satisfy all conditions of equations (11), (12) and (13) are counted and stored to the index LUT. The number of states which produce the same l are also counted and stored for future use in constant acceleration processing. The return loop commands allowing discarding of combinations is:

40 continue and the main loop returned is provided by:

```
continue
return
end
```

At this point, the index LUT 120 will be complete to provide access to the data sample LUT 118. Returning to FIG. 6, a block of J (=32) data samples of the complex values of the returned signals can now be input to the data sample register 110 (FIG. 5) as shown at 206. Then, all allowed combination of the data samples are selected by multiplexer 112 and multiplied by multiplier 114 and the products placed in the data sample look-up table 118 in accordance with pairs of addresses ranging from 1 to J.

Equation (19) can now be performed. A sequencer 130 which effectively functions as a clock which is synchronized to the processing provides a logical 0 or 1 to dual selector 132, 132' such that, at any instant, one pair of values of $t_a$ and $t_b$ or $t_c$ and $t_d$ will be provided to the data sample look-up table. Of course, two such tables could be provided to allow a single access of each. However, it is considered more efficient to provide only a single table from which a single product is retrieved at a time since the data sample LUT is large and stored data would be redundant (unless the conjugates of the products are pre-computed for storage in a second table). However, since some products will not be used, it is more efficient to compute the conjugate later and only for those products actually retrieved.

To perform equation (19), the accessed product is provided to a demultiplexer 140 which is also driven by sequencer 130 and thus synchronized with dual selector 132, 132'. If selector 132 provides addresses to the data sample LUT, the retrieved product is directly stored to register 142. If selector 132' provides addresses to the data sample LUT, the conjugate of the product is computed at 141 and the result stored to register 142'. The values in registers 142 and 142' are then multiplied by multiplier 144 and the result accumulated.

Figure 6:
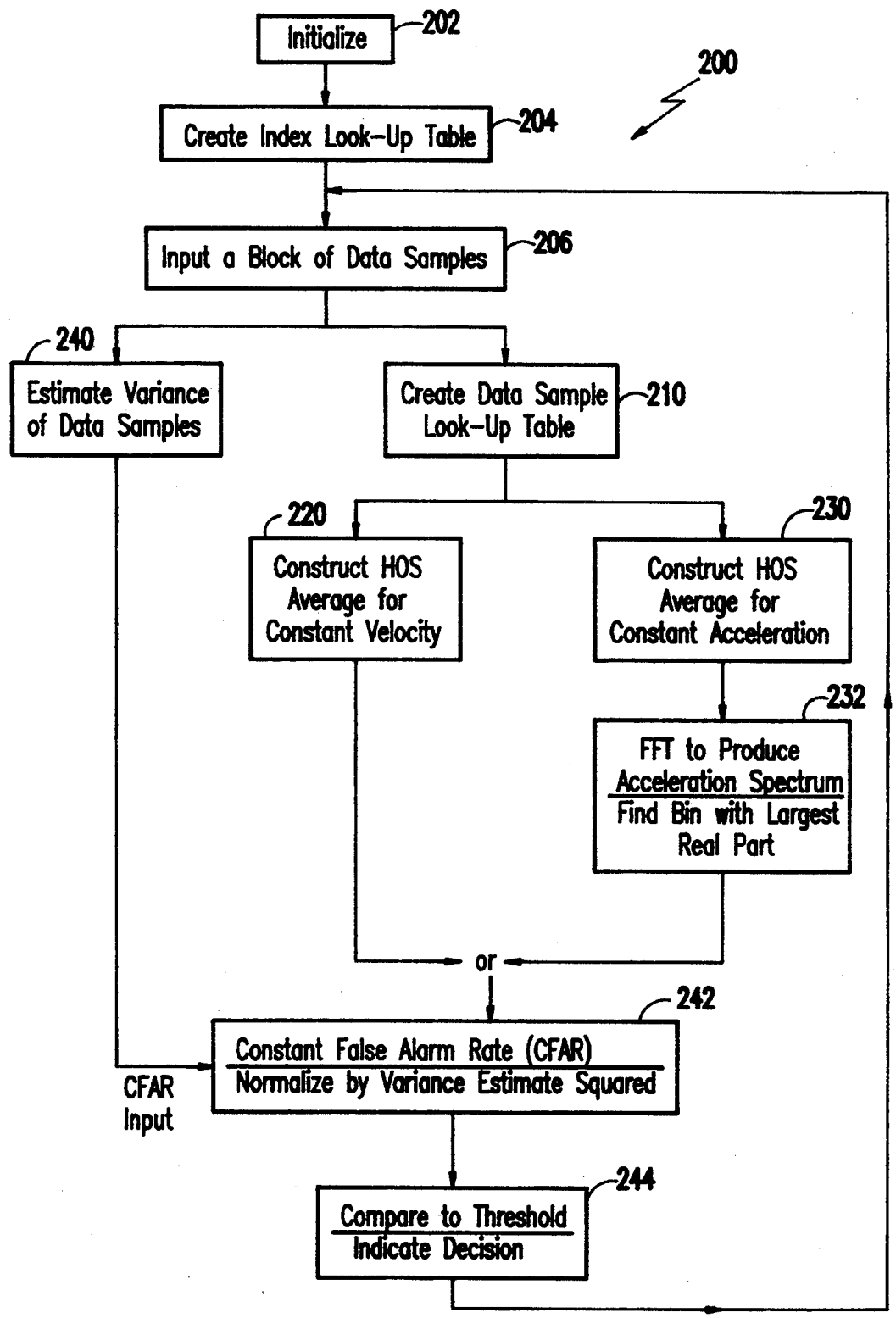
FIG. 6 is a flow chart illustrating operation of the preferred embodiment of FIG. 5, 5A and 5B.

In order to accommodate processing for both constant velocity and constant acceleration, it is preferable to accumulate the result of multiplication in two different ways simultaneously, corresponding to processes 220 and 230 of FIG. 6. For the constant velocity case where lags are, by definition, the same, accumulation at accumulator 146 is without regard to lag, l. At the conclusion of the process, the accumulated result is divided by 2600 as the HOS average for the constant velocity case. For the constant acceleration case, accumulation is done by lags with the calculated value of l, stored in the index LUT and divided by the number of values accumulated for each value of l for each set of data to be retrieved, in sequence, with l used as an address in accumulator array 150 in which the accumulation is to be done.

Figure 5A:
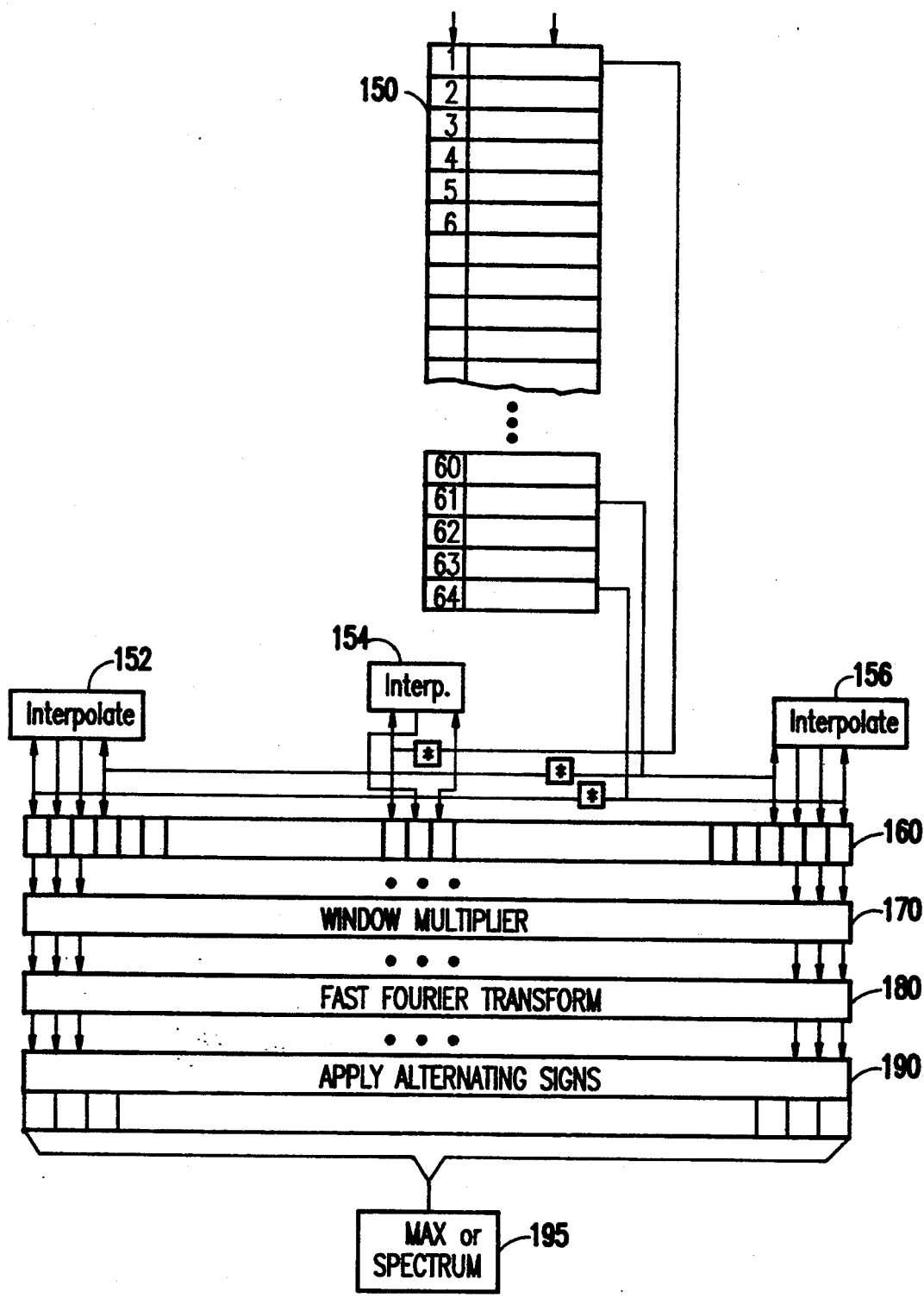
Figure 5B:
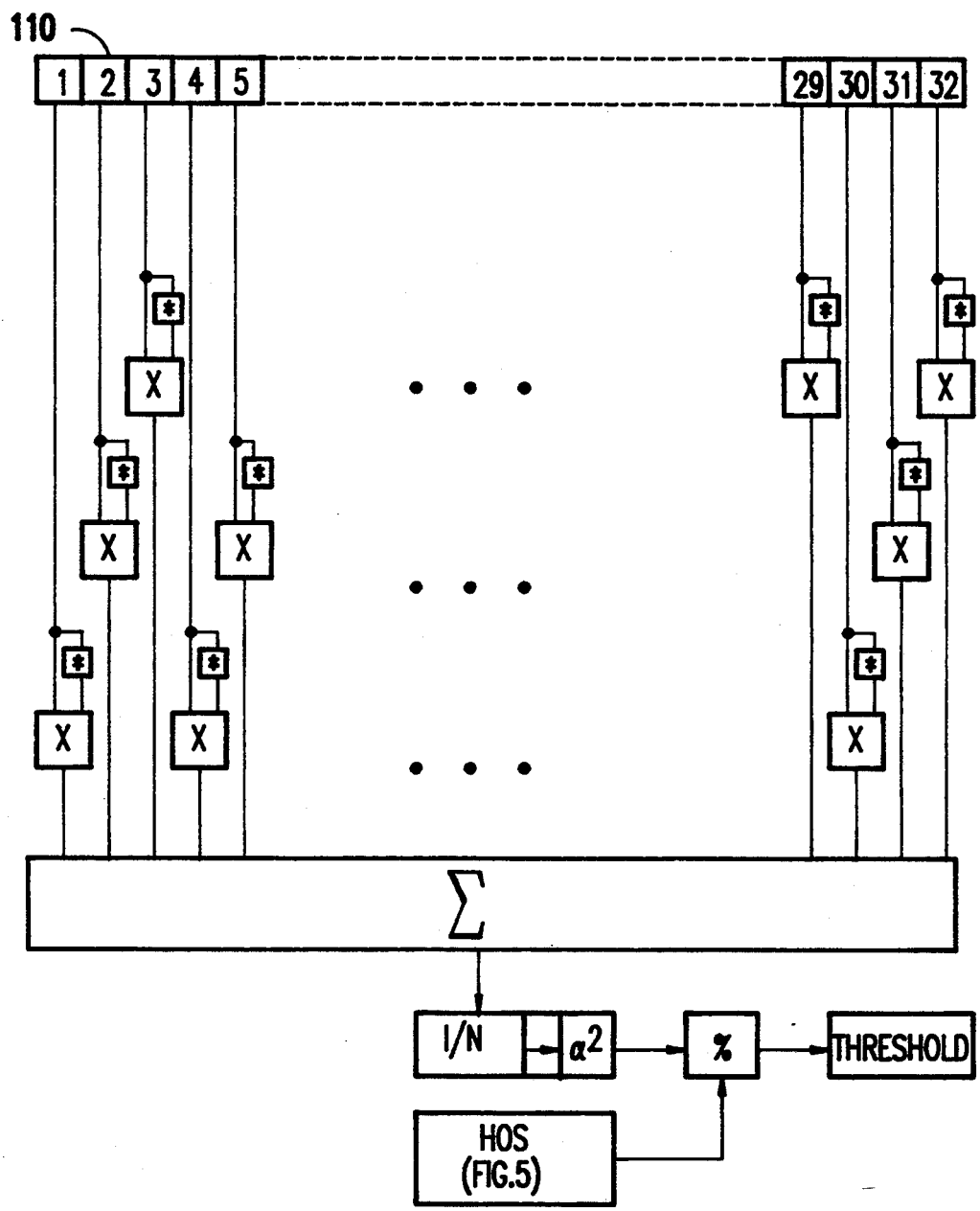

Referring now to FIG. 5A in which accumulator array 150 is repeated for reference, the accumulated values corresponding to values of l from 1 to 64 are mapped into a register 160 each value is directly mapped into a stage of register 160 from 65-128 and the conjugate is computed and stored in a mirror-symmetrical location in stages 1 to 64. As pointed out above, there will be no accumulated value for a lag of zero or for certain other values of l, such as 62 and 63. These values are supplied by interpolation by interpolators 152, 154 and 156. Any interpolation technique is suitable for this purpose, and the details of the interpolation function performed are unimportant to the practice of the invention.

Then, if desired (e.g. to de-emphasize the values toward the ends of the register), each value can be multiplied by a value to impose a window on the data in register 160 by multiplier window 170. It should be noted that the application of a window of a particular shape is common practice in the art to remove side lobes and improve resolution. In the invention, at the present time, a cosine window is used on the theory that the density of interpolated values (for which there is no l produced by a combination of a, b, and c) will increase near the ends of register 160. The cosine window results in a slight loss of performance over a constant weighting (e.g. rectangular window) but has value when resolving the acceleration between detected targets.

The symmetrical mapping of values and conjugates into register 160, as shown, causes an artifact to be developed by performance of a fast Fourier transform 180 which can be eliminated after the sign of each value is inverted at 190 after the fast Fourier transform is performed at 180. The results then correspond to accelerations, sorted into "bins" from which a maximum real part can be selected or the real parts of the values in the "bins" displayed as an acceleration spectrum at 195. The display of an acceleration spectrum is preferred, as discussed above, particularly where plural targets having different accelerations may be present.

Then to complete the process, the result of either the constant velocity case and/or the constant acceleration case is compared to a threshold to determine whether detection has occurred. In practice, the threshold is empirically adjusted (e.g. manually) until the false alarm rate falls to an acceptable level such as $10^{-4}$ below true detections. However, some dynamic adjustment of the test statistic prior to thresholding is particularly advantageous in combination with the present invention. This dynamic adjustment is referred to as constant false alarm rate (CFAR). CFAR is considered to be a perfecting feature of the invention and will now be discussed with reference to FIG. 5B.

From studies of the characteristics of sea clutter, the noise resulting from sea clutter will not be constant but will be modulated by ocean waves since such sea clutter is believed to be a surface effect where small waves are superimposed (e.g. raised and lowered) by ocean swells. Thus ocean swells modulate the magnitude of the noise component present. Therefore, returning to equations (1) and (18), the power of the returned signal, including noise and clutter, is given by:

$$ss^* + \sigma_\eta^2 = \sum_{j=1}^{J=32} r(t_j) r^*(t_j) \qquad (21)$$

Therefore, by multiplying each value in the sample input register 110 with its conjugate, summing the results and dividing by J (=32), an estimate of the variance of the "signal-plus-noise" (or noise variance if a target is not present) data samples (or more properly, an estimate of the signal power (if any) plus noise variance, since the signal, by definition, should not have a variance) can be derived. This result may be divided by the HOS estimator to derive a ratio to be used as a modified test statistic value. This will adjust the test statistic to a fixed threshold such that the dynamic variations in the noise statistic maintain the false alarm rate to quite closely track a constant value, on average.

Figure 7:
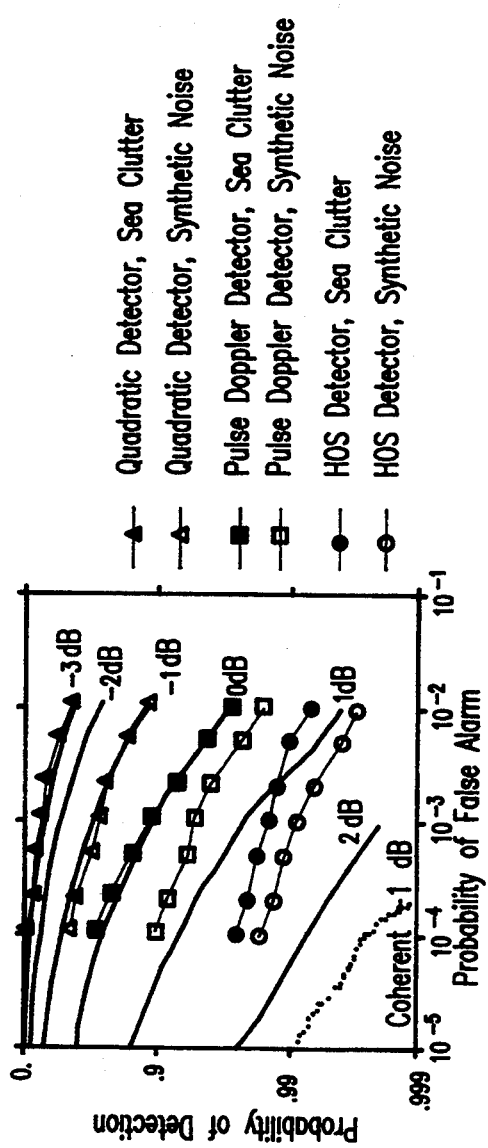
FIG. 7 is a plot of performance of quadratic, pulse Doppler and HOS detectors against theoretical ROC curves for a constant velocity target and using 32 samples.
Figure 8:
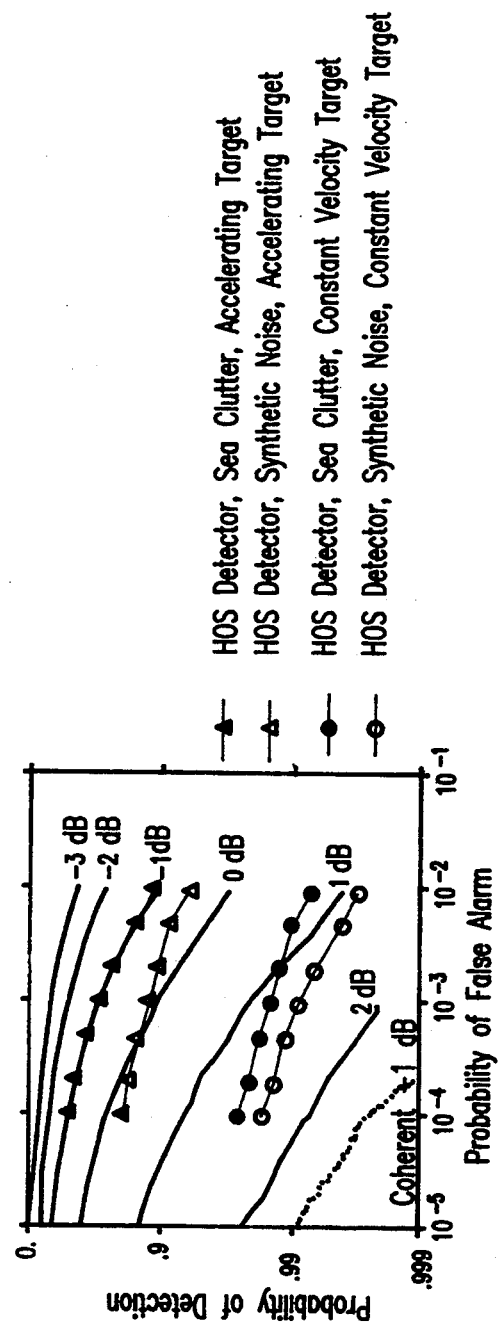
FIG. 8 is a plot of the performance of the invention for constant velocity and accelerating targets.

To demonstrate the efficacy of the invention and radar systems incorporating it, reference is now made to FIGS. 7 and 8, showing comparisons with real and simulated test data in blocks of 32 samples each (and not incorporating the CFAR enhancement described above). In both of FIGS. 7 and 8, the unsymboled solid lines with dB identifiers represent accepted values of theoretically optimum receiver operating characteristics (ROC) of a quadratic detector as reported in Detection of Signals in Noise by A. D. Whalen, published by Academic Press, 1971. The unsymboled dotted line marked "coherent -1dB" reflects theoretically optimum ROC of an ideal coherent detector as derived by Whalen. The lines marked with symbols all reflect simulated ROC performance of different types of radar detectors including different sources of noise (e.g. synthetic noise and sea clutter) at a signal-to-noise ratio of $-1$ dB. All simulations were conducted using real and simulated signals in blocks of 32 samples each for a constant velocity target and a constantly accelerating target.

The performance of a quadratic detector as shown in FIG. 7 closely follows the theoretical optimum for synthetic noise (at $-1$ dB) but is degraded by about 2 dB amid sea clutter. The ROC for a pulse Doppler radar detector shows an improvement of about 1.5 to 1.6 dB over theoretically optimum performance of a quadratic detector for synthetic noise but is degraded to be about equivalent to the performance of a quadratic detector at a SNR of 0 dB in sea clutter. That is, a quadratic detector would have to be provided with signals having a SNR of 0 dB in sea clutter to provide detection performance equivalent to a pulse Doppler detector receiving signals having a $-1$ dB SNR.

The performance of the HOS detector in accordance with the invention, as shown in FIG. 7, shows approximately a 1 dB or better improvement over pulsed Doppler systems for similar input signals and is much less degraded by sea clutter. Perhaps most importantly, the performance of the HOS detector in accordance with the invention represents an improvement over pulsed doppler systems which is a large fraction of the difference in performance between pulsed doppler systems and theoretically optimum performance of ideal coherent detectors at $-1$ dB SNR, indicated by the dotted line in FIGS. 7 and 8. As pointed out above, an ideal coherent detector may be regarded as a standard against which other radar systems must be judged since, if the phase of the returned signal is known, the receiver may be optimized for that signal and thus optimally detect it (even though no additional information is acquired by such ideal detection). Thus, it is seen that the HOS detector of the present invention provides a much closer approach to ideal performance than has been previously attained and, yet, is a practical system since information which was not known can be acquired by the system.

FIG. 8 compares performance of the HOS detector of the invention for constant velocity and accelerating targets and for synthetic noise and sea clutter, again at $-1$ dB SNR and for J=32 samples. Therefore, the lower two marked lines of FIGS. 7 and 8, depicting performance for a constant velocity target are the same. While substantial degradation of performance is seen for an accelerating target (about 1.5 dB), the performance of the HOS detector of the invention is never less than theoretically optimum performance for a quadratic detector at the same SNR. Applied to an accelerating target in time-varying clutter, the HOS detector is about 2 dB better than the quadratic detector.

It is also significant to note, however, that in this regime of detection of an accelerating target, pulse Doppler detectors are not operable due to that acceleration of the target. In this regard, the sensitivity of pulse Doppler detectors to acceleration is well recognized. For quantitative comparison, a pulse Doppler system loses approximately 3 dB of sensitivity at a very small target acceleration of 0.0082G and is considered completely ineffective at an acceleration of 0.05G for an observation time of 0.8 seconds and at conventional X-band radar wavelengths. An example of these levels of acceleration would be sea ice moving under the oscillating forces due to ocean waves. The present invention remains highly effective to detect such objects.

Figure 9:
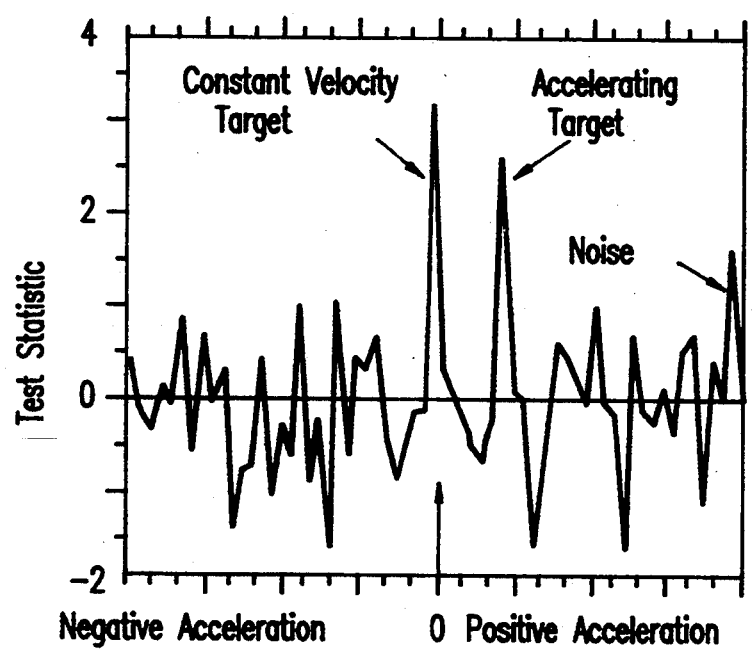
FIG. 9 shows an acceleration spectrum of two detected targets produced in accordance with the invention.

An added benefit of HOS detection is that an acceleration spectrum can be defined from the transform of Equation (19), above. FIG. 9 represents such a acceleration spectrum for two targets, each at $-1$ dB SNR. When the above-described processing for acceleration is done, the result is a spectrum in which the position of the peak indicates acceleration and the amplitude of the peak is related to the target's RCS squared.

In view of the foregoing, it is seen that the HOS detector in accordance with the invention provides a radar detection system of enhanced sensitivity and permits coherent receivers to be used for detection of moving and accelerating targets and amid system noise and sea clutter.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A signal detection method including a computation of a test statistic from combinations of values in a block of signal samples, said signal detection method including the steps of
   eliminating combinations of said samples which are redundant,
   excluding combinations of samples in which noise present in said samples would bias said test statistic from said list of said combinations of said samples, and
   determining detection of a signal based on a test statistic computed only from remaining combinations of said samples.

2. A method as recited in claim 1 wherein said signal samples are samples of transmitted signals which are returned to a receiver by reflection.

3. A method as recited in claim 2, wherein said transmitted signals are radar signals.

4. A method as recited in claim 1, including the further steps of forming a list of remaining combinations of said samples, accessing said remaining combinations of samples in said list in a sequence, and accumulating said test statistic as an average of a sequence of values of results of a computation from values of combinations of said samples accessed by said accessing step.

5. A method as recited in claim 1, including the further step of determining a lag index corresponding to each said remaining combination of values.

6. A method as recited in claim 5, including the further steps of accessing one of said remaining combinations of samples having the same lag index, and accumulating said test statistic as an average of a sequence of values of results of a computation from values of combinations of said samples accessed by said accessing step in accordance with combinations of samples having said lag index.

7. A method as recited in claim 6, including the further step of accumulating a test statistic value for each value of said lag index forming a plurality of test statistics.

8. A method as recited in claim 7, including the further steps of finding a complex conjugate of each of said plurality of test statistics, forming an array of values of said plurality of test statistics and said complex conjugates of said test statistics which is mirror-symmetrical by lag index and in which values of ones of said plurality of test statistics are arranged by ascending value of lag index and said complex conjugates of said test statistics are arranged in descending order of lag index, and performing a fast Fourier transform on said array of values.

9. A method as recited in claim 8, including the further step of determining a maximum real part of results of said fast Fourier transform.

10. A method as recited in claim 8, including the further step of forming a spectrum of real parts of results of said fast Fourier transform.

11. A method as recited in claim 1, including the further steps of forming a table of products of pairs of samples of signals, accessing a first product from said table of products in accordance with a first pair of values of ones of said remaining combinations of values, accessing a second product from said table of products in accordance with a second pair of values of ones of said remaining combinations of values, and determining a complex conjugate of said second product.

12. A method as recited in claim 11, including the further steps of multiplying said first product by said complex conjugate of said second product.

13. A method as recited in claim 1, wherein said step of excluding combinations of samples from said list of said combinations of said samples comprises the step of testing possible combinations of four samples $t_a$, $t_b$, $t_c$, $t_d$ against the conditions:

$t_a \neq t_c$ and $t_b \neq t_c$.

14. A method as recited in claim 1, including the further steps of determining a complex conjugate of each signal sample in said block of signal samples, averaging all said signal samples and said complex conjugates of said signal samples, dividing a result of said averaging step by said test statistic, and adjusting a detection threshold in accordance with a result of said dividing step.

15. Apparatus for detection of a signal in the presence of noise comprising a data sample look-up table for storing products of pairs of data values from a block containing a plurality of data values, an index look-up table containing combinations of addresses, in first and second pairs, for accessing values in said data sample look-up table in which combinations of addresses which are redundant over other combinations of addresses in said index look-up table and combinations of addresses in which either of the addresses of said first pair of addresses was the same as one of the addresses of said second pair of addresses are excluded.

16. Apparatus as recited in claim 15, further including means for accessing products in said data sample look-up table with said first and second pairs of addresses from said index look-up table, in sequence, means for determining a complex conjugate of the product accessed from said data sample look-up table in accordance with said second pair of addresses, means for multiplying said complex conjugate by the product accessed from said data sample look-up table in accordance with said first pair of addresses, means for accumulating and averaging values output by said means for multiplying to derive a test statistic, and detector means for testing an output of said means for accumulating and averaging against a threshold to determine detection of a signal.

17. The apparatus as recited in claim 16, further including means for determining a lag index for each combination of addresses in said index look-up table, and wherein said means for accumulating and averaging values output by said means for multiplying includes means for storing said values output by said means for multiplying in accordance with said lag index.

18. The apparatus as recited in claim 17, further including means for determining a complex conjugate of each average stored by lag index as stored by said storing means, a memory means for storing said complex conjugate in a portion of an array which is mirror symmetrical, by lag index, a corresponding average stored by lag index by said storing means to form an array of values, and means for performing a fast Fourier transform on said array of values.

19. The apparatus as recited in claim 16, further including means for determining a complex conjugate of each signal sample in said block of signal samples, means for averaging all said signal samples and said complex conjugates of said signal samples, means for dividing a result of said averaging step by said test statistic, and means for adjusting a detection threshold of said detection means in accordance with an output of said means for dividing.

20. The apparatus of claim 15, in combination with a coherent radar system.

* * * * *